May 19, 1925.
N. HERZMARK
1,538,700
STARTING DEVICE FOR INTERNAL COMBUSTION ENGINES
Filed Aug. 5, 1920 2 Sheets-Sheet 1
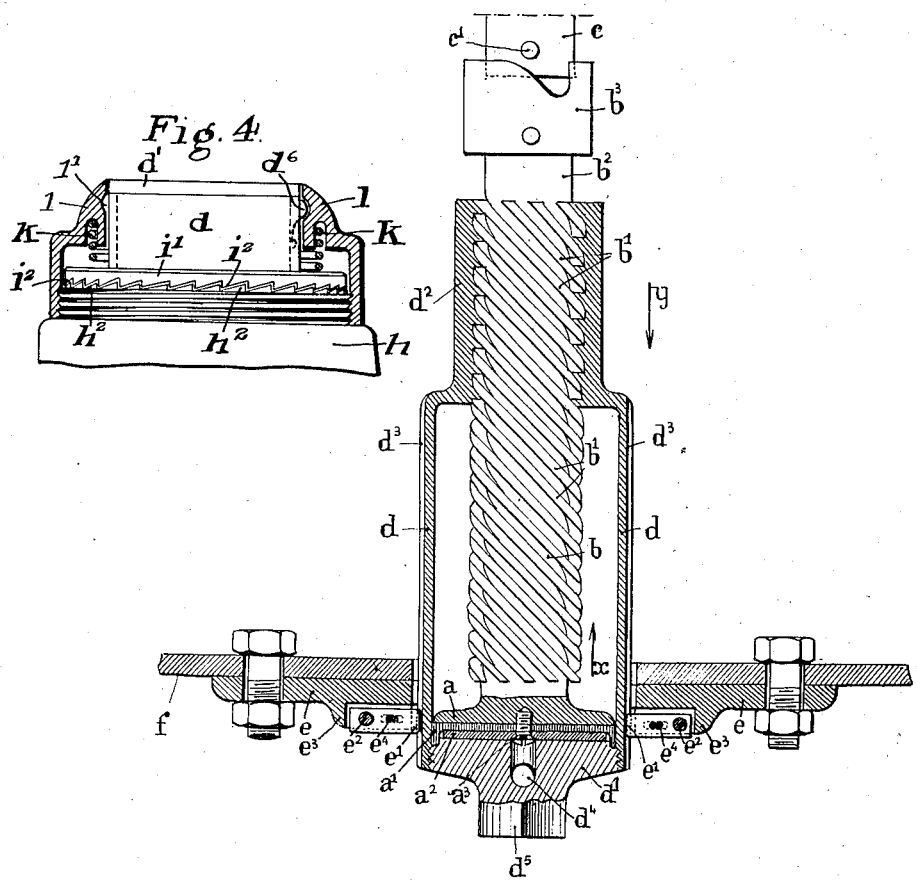
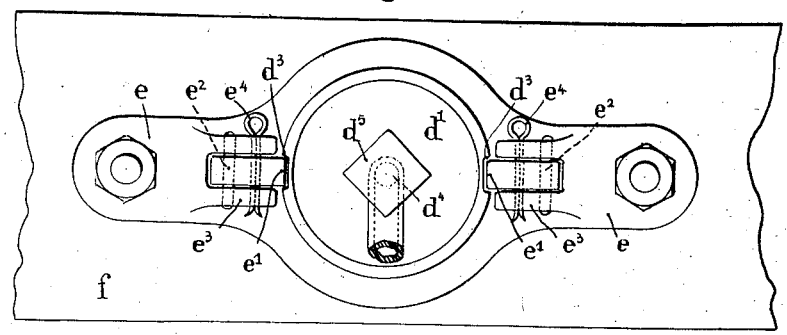
INVENTOR
NICOLAS HERZMARK
BY
ATTORNEYS May 19, 1925.

N. HERZMARK 1,538,700

STARTING DEVICE FOR INTERNAL COMBUSTION ENGINES

Filed Aug. 5, 1920   2 Sheets-Sheet 2

INVENTOR
NICOLAS HERZMARK
BY Howson and Howson
ATTORNEYS

Patented May 19, 1925.

1,538,700

UNITED STATES PATENT OFFICE.

NICOLAS HERZMARK, OF PARIS, FRANCE.

STARTING DEVICE FOR INTERNAL-COMBUSTION ENGINES.

Application filed August 5, 1920. Serial No. 401,351.

*To all whom it may concern:*

Be it known that I, NICOLAS HERZMARK, a citizen of the French Republic, and a resident of 11 Rue Labie, Paris, France, have invented new and useful Improvements in a Starting Device for Internal-Combustion Engines, of which the following is a specification.

This invention relates to a starting device for internal combustion engines, which can be mounted directly upon any such engine and reproduces by its method of operation the action of the crank or handle usually employed for starting these engines.

It comprises essentially a piston with screw-threaded piston-rod, which by a small longitudinal movement can enter into engagement with the end of the crank shaft or of a shaft connected thereto, and a cylinder forming or integrally secured to a nut which fits the screw-threaded rod, the said cylinder being free to travel longitudinally but prevented from revolving in relation to the engine base. This cylinder is connected at one end to a source of compressed gas, an air cylinder or the like, so that when compressed air is admitted to the cylinder, there is first produced a longitudinal displacement of the piston which encounters no resistance, while the cylinder remains stationary in its guides; this displacement continues until the end of the piston-rod provided with a suitable jaw-clutch or like device comes into engagement with the other member of the clutch carried by the engine crank shaft. From this movement onwards, the piston is no longer free to travel longitudinally, and therefore the cylinder travels along its guides, but since it is restrained from turning, the screw-threaded piston-rod screws through the nut formed or carried by the cylinder and thus revolves, carrying round the engine shaft with it. It is to be noted that the engagement of the two parts of the clutch takes place very gently whatever be the pressure exerted upon the piston, because as soon as the piston-rod encounters a greater resistance than that offered by the friction of the cylinder guides, which friction may be reduced as low as possible, it is the cylinder which yields and moves away.

In case the engagement of the two members of the clutch, viz, the piston-rod and the crank-shaft, ceases for any reason, there occurs immediately a fresh longitudinal movement of the piston which restores the engagement. Since the cylinder is arranged to travel longitudinally, it is necessary to connect it to the source of compressed gas either by a flexible pipe or by a telescopic tube and stuffing box device, or by any other suitable means for the purpose.

This starting mechanism may be mounted directly in place of the starting crank on any automobile vehicle, it being only necessary to secure the cylinder guides upon the front cross-member of the frame and to fasten the ratchet-toothed clutch member upon the end of the screw-threaded piston-rod which is cut to the required length.

In order, however, to allow the use of the ordinary starting handle for revolving the engine shaft in certain cases, for example for adjusting the engine, the cylinder guides are mounted in such a way that they may be removed or withdrawn, so as to allow the cylinder to be freed in relation to the cylinder base; then by fitting a crank handle upon the end of the cylinder, which is constructed to receive the same, the engine may be cranked or started by hand with the ordinary starting handle, with the difference that the mechanism acts as a device for preventing kicking of the crank due to backfires. It is, of course, necessary first to disconnect the pipe supplying the compressed gas to the cylinder.

A compressed air cylinder or any other convenient arrangement may be employed as source of the compressed gas.

Two forms of construction of the invention are represented upon the accompanying drawing, but it will be understood that these are merely examples, to which the invention is in no respect limited.

Figure 1 is a plan of the first form of construction of the mechanism, partly in axial longitudinal section.

Figure 2 is an end view of the apparatus shown in Figure 1.

Fig. 4 is an axial section partially in elevation, of a detail of the construction shown in Fig. 3.

Figure 3:
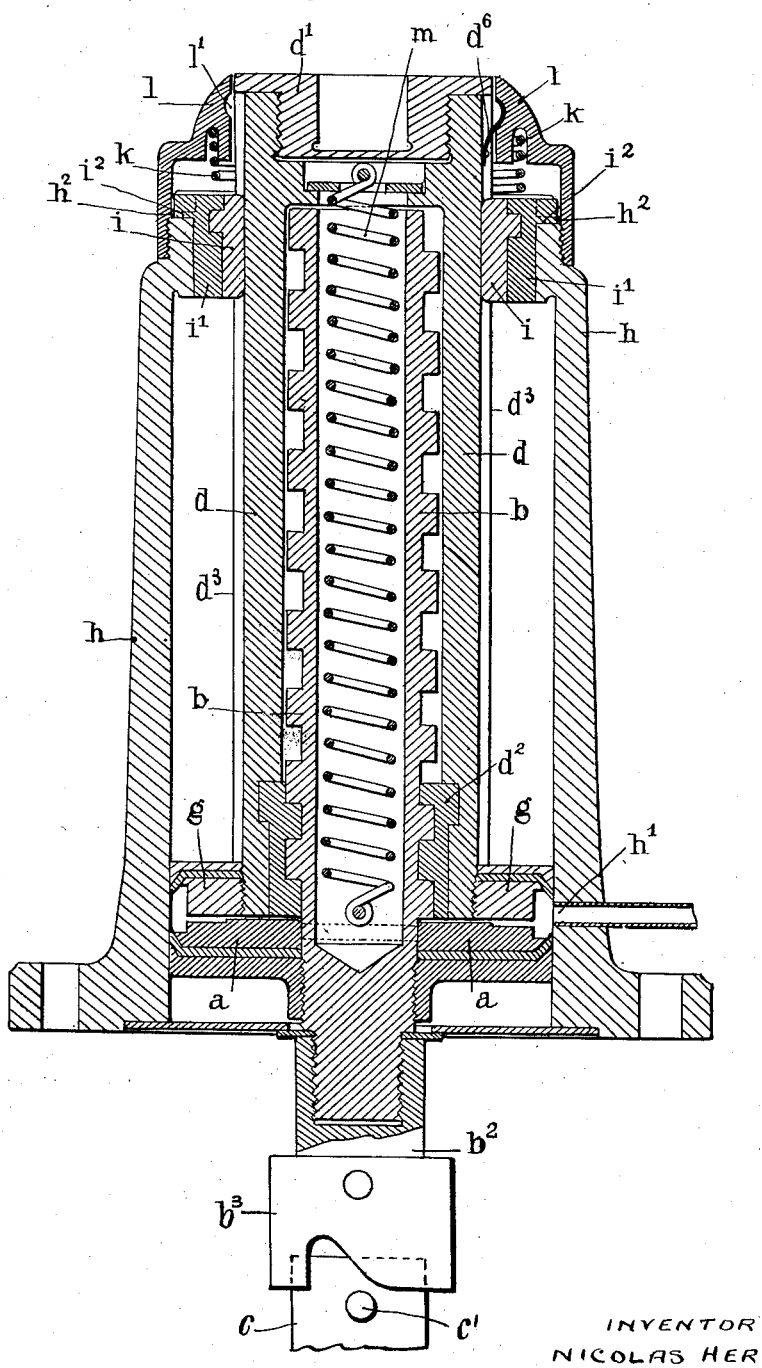
Figure 3 is an axial longitudinal section of a second form of construction.

The piston $a$ is provided with a cup leather or bucket $a^1$ secured by a washer $a^2$ and a screw $a^3$. The piston rod $b$, is provided with a number of screw threads $b^1$ of very quick pitch. The unthreaded end $b^2$ of the rod carries one member of the coupling which engages the crank shaft $c$, for example, a ratchet-toothed jaw clutch $b^3$, while the crankshaft $c$ carries the usual driving or cotter pin $c^1$.

The piston $a$ is adapted to travel within a cylinder $d$ closed at its front end by a cover $d^1$ and at its rear end by a nut $d^2$ into and through which is screwed the threaded portion $b^1$ of the piston rod.

The cylinder is furnished upon its outer surface with longitudinal grooves or guideways $d^3$ for preventing the cylinder from revolving but allowing it to travel longitudinally, remaining in engagement with lugs or projections $e^1$ which are secured upon the engine base or other stationary part. These lugs may be carried, for example, upon a plate $e$ which is fixed upon the front cross-members $f$ of the frame, when the mechanism is installed upon a motor vehicle. The projections $e^1$ instead of being integral with the plate $e$ are each formed by a kind of bolt or latch mounted upon a pin $e^2$ in a knuckle $e^3$ provided on the plate $e$, the latches being normally locked by split pins $e^4$. By removing these pins $e^4$, it is possible to free the latches $e^1$ from the grooves $d^3$ and thus to release the cylinder, allowing it to turn in relation to the vehicle frame.

It will be understood that the guide device described and shown may be replaced by any other suitable arrangement.

The cylinder cover $d^1$ is provided with a port $d^4$ which allows communication between the forward end of the cylinder and a source of compressed gas, either by means of a flexible pipe, by one tube telescoping within another by means of a stuffing box, by tubes hinged together with knee-joints, or other suitable contrivances.

The cover $d^1$ is also provided with a squared shank $d^5$ adapted to receive a crank handle.

The following is the operation of the mechanism, starting from the position occupied by the various parts in Figure 1.

If a certain quantity of compressed air is admitted through the inlet port $d^4$ by means of a control valve or other device, in the first place the piston $a$ moves freely in the direction of the arrow $x$, while the cylinder which has to overcome in its movement the frictional resistance of the guides, remains stationary. At the same time the piston revolves slightly, but this travel is very short because the coupling jaw $b^3$ enters almost at once into engagement with the cotter pin $c^1$ upon the crankshaft. This initial movement corresponds to the inward motion given to the ordinary starting handle for engaging it with the crankshaft. Hereafter the piston is prevented from moving axially but is free to revolve, provided it rotates the crank-shaft with it. The cylinder now begins to travel endwise, overcoming the frictional resistance of its guides, and moving axially in the direction of the arrow $y$. The piston is thereby caused to revolve, rotating the engine in the same manner as the ordinary starting crank.

By admitting compressed air to the other side of the piston, while the forward side is connected to the exhaust by a suitable valve, slide or other distributor, the cylinder and piston are brought back to their initial position. Alternatively, as has been stated before, a spring may be employed to produce the same effect.

In order to start the engine by hand, it is only necessary to withdraw the projections $e^1$, first removing the split pins $e^4$ and turning the latches around their pivots, and then to fit a crank-handle upon the square $d^5$. The mechanism then acts as a means for preventing kicking of the crank due to back-fires.

The apparatus may be applied not only to motor vehicles engines, but also to engines of other types which require a starting device, Diesel or semi-Diesel engines, gas engines and the like.

Figure 3 represents in axial section another form of construction of the apparatus, which differs from the first in that it comprises two movable pistons inside a stationary cylinder; one of said pistons is integral with the screw and serves as in the previous example by a slight longitudinal movement to engage the jaw coupling of the apparatus with the crankshaft, and the second piston which carries the cylindrical nut then moves under the action of the expansive gas as to revolve the screw and thus start the engine.

The piston $a$ is integral with or secured to the screw $b$ which is hollowed out internally; the piston $g$ is integral with or secured to the cylinder $d$, carrying at its bottom end the nut $d^2$ in which the screw $b$ is engaged. The pistons $a$ and $g$ are guided in an air-tight manner within a stationary cylinder $h$, having an orifice $h^1$ through which the gases can be admitted to the space between the two pistons. The piston $a$ is revoluble within the cylinder $h$ but can move longitudinally therein only to a small extent, just sufficient to engage the coupling-jaw (not shown) which is mounted on the shaft $b^2$, into engagement with the engine shaft (also not shown). The cylinder $d$ is prevented from revolving in relation to the fixed cylinder $h$ by means of longitudinal grooves $d^3$ formed on its outer surface and by feathers $i$, integral with a ring $i^1$ provided at its upper part with the ratchet teeth $i^2$ engaging with corresponding teeth $h^2$ carried by the cylinder $h$ (see Fig. 4). These teeth are directed in such a way that they allow the ring $i^1$ to revolve from right to left but oppose its rotation from left to right. A spring $k$ bearing against a cover $l$ screwed upon the cylinder $h$ tends to maintain the teeth $h^2$ and $i^2$ in constant engagement. A coiled spring $m$ located inside the screw $b$ is attached at one extremity to the lower end of this screw and at its other extremity to the top of the cylinder $d$, tending to maintain the two pistons $a$ and $g$ constantly in contact. The cylinder $d$ carries at its upper end a plug $d^1$ adapted to receive a starting crank when it is desired to start the engine by hand. The cover $l$ is provided internally with a throat or groove $l^1$, within which, when the apparatus is at rest, there is engaged a plate spring $d^6$ carried by the cylinder $d$ and so shaped that it is necessary to exert a certain force in order to displace the cylinder $d$ either inwards or outwards.

The operation of the mechanism is analogous to that of the device previously described.

Gas under pressure being admitted at $h^1$ between the two pistons, first pushes down the piston $a$ which is fast to the screw $b$; this piston revolves with the shaft $b^2$, advancing to an extent just sufficient to bring the jaw carried by the crank shaft $b^2$ into engagement with the engine shaft. Hereafter the piston $g$ in its turn moves endwise with the cylinder $d$ and nut $d^2$; but since the cylinder $d$ cannot revolve in relation to the cylinder $h$ because the teeth $i^2$ $h^2$ oppose the tendency of the ring $i$ to revolve from left to right, it merely travels longitudinally and rotates the screw which thus turns the engine. When the admission of compressed gas is shut off, the two pistons resume their initial position under the action of the spring $m$.

In order to crank the engine by hand, it is only necessary to fit a crank handle upon the plug $d^1$, to push inwards as usual, and to turn the crank. Since this rotation is from right to left, the teeth $i^2$ upon the ring $i$ are able to slip over the teeth $h^2$, so that the crank is allowed to rotate the whole group composed of the screw $b$, the ring $i^1$, the cylinder $d$, and the pistons $a$ and $g$, thus turning the crank-shaft of the engine.

What I claim is:

1. A starting device for internal combustion engines and the like, comprising a rotatable member susceptible of slight longitudinal displacement, a screw secured to said member, a nut engaging said screw, a second member fast with said nut and longitudinally displaceable in a direction opposite to that of the first mentioned member, means for admitting compressed gases between said movable members, means for returning both members against one another, and means for coupling the rotatable and longitudinally displaceable member with the engine shaft.

2. A starting device for internal combustion engines and the like, comprising a piston susceptible of a rotary movement and of a slight longitudinal displacement, a screw secured to said piston, a nut engaging said screw, a second piston fast with said nut and longitudinally displaceable in a direction opposite to that of the first mentioned piston, a stationary cylinder for both pistons, means for longitudinally guiding the first piston in said cylinder, means for admitting compressed gases between both pistons, spring means for returning both pistons against one another, and means for coupling the stem of the screw to the engine shaft.

3. A starting device for internal combustion engines and the like, comprising a piston susceptible of a rotary movement and of a slight longitudinal displacement, a screw secured to said piston, a nut engaging said screw, a second piston fast with said nut and longitudinally displaceable in a direction opposite to that of the first mentioned piston, a stationary cylinder for both pistons, means for longitudinally guiding the first piston in said cylinder, means for admitting compressed gases between both pistons, spring means for returning both pistons against one another, and means for coupling the stem of the screw to the engine shaft, together with means for engaging a starting crank with the longitudinally displaceable first piston, and releasable clutch means between the guide means of said piston and the stationary cylinder, for the purpose described.

In testimony whereof I have signed my name to this specification.

NICOLAS HERZMARK.

Witnesses:
CHARLES DOWNE,
W. DEFÈVRIMONT.